United States Patent [19]

Akiyama

[11] Patent Number: 5,618,065
[45] Date of Patent: Apr. 8, 1997

[54] ELECTRIC WELDING PIPE JOINT HAVING A TWO LAYER OUTER MEMBER

[75] Inventor: Saburo Akiyama, Kuwana, Japan

[73] Assignee: Hitachi Metals, Ltd., Tokyo, Japan

[21] Appl. No.: 504,866

[22] Filed: Jul. 20, 1995

[30] Foreign Application Priority Data

Jul. 21, 1994 [JP] Japan .................................. 6-169253
Mar. 23, 1995 [JP] Japan .................................. 7-063783

[51] Int. Cl.⁶ .................................................. F16L 47/02
[52] U.S. Cl. ........................ 285/21.2; 285/284; 156/294; 219/544
[58] Field of Search ........................ 29/611, 423; 285/21, 285/204, 423; 219/544; 264/272.18, 163, 278, 334; 156/294

[56] References Cited

U.S. PATENT DOCUMENTS

| | | | |
|---|---|---|---|
| 4,224,505 | 9/1980 | Sturm ........................... | 285/21 A |
| 4,375,591 | 3/1983 | Sturm . | |
| 4,784,285 | 11/1988 | Patel ........................... | 220/307 |
| 4,825,534 | 5/1989 | White et al. ..................... | 285/21 A |
| 5,125,690 | 6/1992 | Taylor et al. ..................... | 285/21 A |
| 5,163,713 | 11/1992 | Brettell et al. ..................... | 285/21 A |
| 5,255,943 | 10/1993 | Keller et al. ..................... | 285/21 A |
| 5,364,130 | 11/1994 | Thalmann ........................ | 285/21 A |
| 5,375,889 | 12/1994 | Nakashiba et al. .................. | 285/21 A |

FOREIGN PATENT DOCUMENTS

| | | |
|---|---|---|
| 0535247 | 4/1993 | European Pat. Off. . |
| 2664531 | 1/1992 | France . |
| 9103254 | 7/1992 | Germany . |
| 9208024 | 9/1992 | Germany . |
| 3-129195 | 6/1991 | Japan . |
| 0027796 | 1/1994 | Japan .................................. 285/21 |
| 1393983 | 5/1988 | U.S.S.R. .............................. 285/21 |
| 1737216 | 5/1992 | U.S.S.R. .............................. 285/21 |
| WO91/02640 | 3/1991 | WIPO . |

*Primary Examiner*—Eric K. Nicholson
*Attorney, Agent, or Firm*—Finnegan, Henderson, Farabow, Garrett & Dunner

[57] ABSTRACT

An electric welding pipe joint made of a thermoplastic resin and containing a heating resistance wire therein may be produced by forming an inner cylindrical thermoplastic resin member by injection molding, winding a heating resistance wire around the inner cylindrical thermoplastic resin member, and forming two or more layers of an outer cylindrical thermoplastic resin member around the resistance wire-wound inner cylindrical member by injection molding successively.

21 Claims, 7 Drawing Sheets

ELECTRIC WELDING PIPE JOINT HAVING A TWO LAYER OUTER MEMBER

BACKGROUND OF THE INVENTION

The present invention relates to an electric welding pipe joint made of a thermoplastic resin for connecting thermoplastic resin pipes by electric welding, and a method for efficiently producing a thick electric welding pipe joint of a large bore diameter without internal defects.

Figure 9:
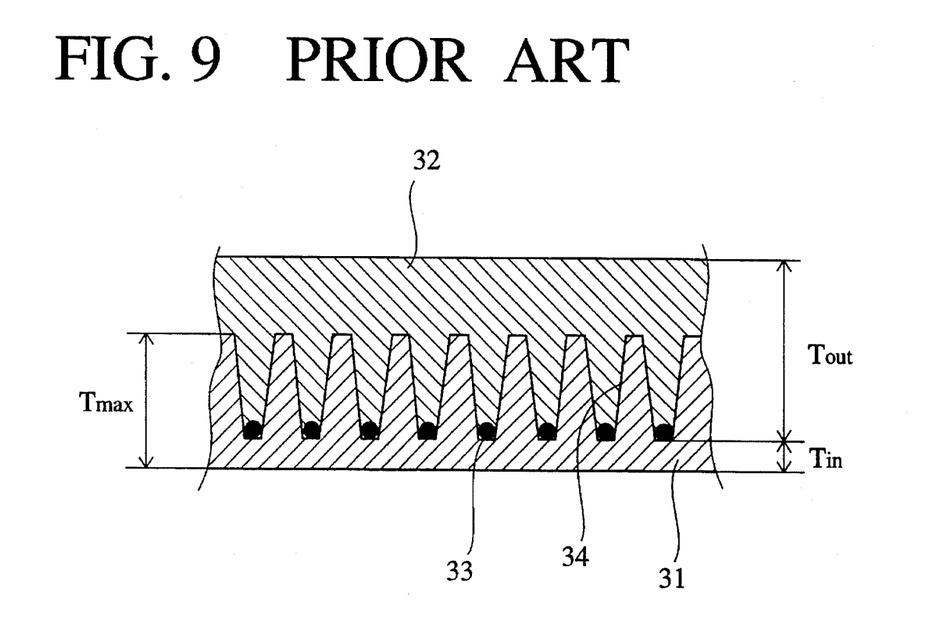
FIG. 9 is a partial cross-sectional view showing a conventional electric welding pipe joint.

Conventionally known as a pipe joint for connecting pipes of thermoplastic resins such as polyethylene by electric welding is an electric welding plastic pipe joint disclosed in Japanese Patent Laid-Open No. 57-69010. As shown in FIG. 9, this electric welding plastic pipe joint comprises an inner cylindrical member 31 made of a thermoplastic resin and having grooves 34 extending from one end to the other of the pipe joint, a heating resistance wire 33 wound around the inner cylindrical member 31 in the grooves 34, and an outer cylindrical member 32 made of the same thermoplastic resin as that of the inner cylindrical member 31 integrally molded around the outer surface of the inner cylindrical member 31. By energizing the heating resistance wire 33 embedded in the outer cylindrical member 32 at a boundary with the inner cylindrical member 31, the electric welding pipe joint is integrally fused with the resin pipes inserted into the pipe joint.

The above plastic pipe joint is produced by integrally forming an outer cylindrical thermoplastic resin member 32 around the inner cylindrical member 31 provided with the heating resistance wire 33 by injection molding. Since the heating resistance wire 33 serves to heat the inner surface of the inner cylindrical member 31 and plastic pipes inserted into the pipe joint for heat fusion therebetween, the heating resistance wire 33 should be mounted as close to the inner surface of the inner cylindrical member 31 as possible. For this reason, the inner cylindrical member 31 should have a thickness $T_{in}$ of 1 mm or less in a flat portion located at the bottom of the grooves 34, even though the pipe joint has a large nominal bore diameter. However, as the nominal bore diameter increases, the thickness of the pipe joint itself increases, leading to an increase in the thickness $T_{out}$ of the outer cylindrical member 32. In a typical example, a pipe joint for connecting gas pipes made of polyethylene has thicknesses of an inner cylindrical member and an outer cylindrical member at each nominal bore diameter as shown below.

| Nominal Bore Diameter (mm) | $T_{in}$ (mm) | $T_{out}$ (mm) |
| --- | --- | --- |
| 50 | 0.5 | 9 |
| 75 | 0.6 | 12 |
| 100 | 0.6 | 14 |
| 150 | 0.6 | 22 |
| 200 | 0.8 | 28 |

When a thick outer cylindrical member 32 is injection-molded around an outer surface of a thin inner cylindrical member 31 as in the above conventional pipe joint, the inner cylindrical member 31 is melted by large injection pressure and heat provided by the injected outer cylindrical member 32, whereby the heating resistance wire 33 wound around the inner cylindrical member 31 in the groove 34 moves irregularly. As a result, short circuiting takes place between the adjacent heating resistance wires 33 at the time of connecting plastic pipes, failing to achieve desired heat fusion.

The thermoplastic resin generally has an extremely low heat conductivity and suffers from a considerable shrinkage in the course of solidification from a molten state. The shrinkage rate of the thermoplastic resin is as large as 4% to 10%, though it may change depending on the types of thermoplastic resins. Accordingly, some injection molding dies suffer from the following problems: If a resin remains partially unsolidified in a cavity after the solidification of a resin in a gate and a runner, a molten resin cannot be supplied to the partially unsolidified region of the resin in the cavity even though injection pressure is increased, resulting in the formation of voids in a resin layer by shrinkage in the course of solidification.

The voids may be prevented by applying large injection pressure for a long period of time by making the gate and the runner thicker. In this case, however, the thin inner cylindrical member 31 is melted causing the heating resistance wire 33 to move, and it takes long time until a resin is completely solidified in a thick portion $T_{out}$, leading to poor production efficiency because of elongated molding cycle.

For the reasons described above, it is difficult to form a thick plastic outer cylindrical member around a thin inner cylindrical member with stable quality by injection molding. This problem is serious particularly in a pipe joint with a nominal bore diameter of 75 mm (3 inches) or more, which comprises an outer cylindrical member having a thickness of 10 mm or more.

OBJECT AND SUMMARY OF THE INVENTION

Accordingly, an object of the present invention is to provide an electric welding pipe joint without the above problems, which does not suffer from short circuiting of a heating resistance wire, voids in resin layers or other internal defects even if it has a nominal bore diameter of 75 mm or more.

The electric welding pipe joint according to the present invention comprises (a) a joint body composed of an inner cylindrical member made of a thermoplastic resin, and an outer cylindrical member formed around the inner cylindrical member and constituted by 2 or more thermoplastic resin layers, and (b) a wound heating resistance wire disposed in the joint body.

The method for producing an electric welding pipe joint made of a thermoplastic resin and comprising a heating resistance wire therein according to the present invention comprises the steps of:

(a) forming an inner cylindrical member of a thermoplastic resin by injection molding;

(b) winding the heating resistance wire around the inner cylindrical member; and (c) forming 2 or more thermoplastic resin layers of an outer cylindrical member around the resistance wire-wound inner cylindrical member by injection molding successively.

In a preferred embodiment, the method for successively producing a plurality of electric welding pipe joints each made of a thermoplastic resin and comprising a heating resistance wire therein comprises:

(a) a first synchronous process comprising the step (i) of forming an inner cylindrical member of a thermoplastic resin for one joint by injection molding, the step (ii) of injection-molding a first outer cylindrical thermoplastic resin member around an outer surface of the inner cylindrical member after wound with the heating resistance wire for another joint, and the step (iii) of injection-molding a second outer cylindrical thermoplastic resin member around an outer surface of the first outer cylindrical member for a further joint, thereby providing a three-layer electric welding pipe joint; and (b) a second synchronous process comprising the step (iv) of freshly injection-molding the same inner cylindrical member as in the step (i) for a still further joint, the step (v) of injection-molding a first outer cylindrical thermoplastic resin member around an outer surface of the inner cylindrical member obtained in the step (i), and the step (vi) of injection-molding a second outer cylindrical thermoplastic resin member around an outer surface of the first outer cylindrical member obtained in the step (ii), thereby providing a three-layer electric welding pipe joint, the second synchronous process being repeated.

DETAILED DESCRIPTION OF THE PREFERRED EMBODIMENTS

The electric welding pipe joint of the present invention comprises an inner cylindrical thermoplastic resin member, and an outer cylindrical thermoplastic resin member, and a heating resistance wire.

The electric welding pipe joint preferably has an inner cylindrical member and an outer cylindrical member each constituted by two or more resin layers having a thickness of 15 mm or less, preferably 10 mm or less. Though the quality of the injection-molded pipe joint is greatly affected by the injection molding conditions such as the amount of an injected resin, injection temperature, etc., such influence on the quality of the injection-molded pipe joint can be minimized if each injected resin layer is as thin as 15 mm or less.

The electric welding pipe joint typically has an outer cylindrical member constituted by two or three resin layers, and layers constituting the inner cylindrical member and the outer cylindrical member may be made of different thermoplastic resins. The inner cylindrical member may be formed by winding resin-coated resistance wire around a mandrel with or without a resin layer.

The thermoplastic resin for the inner and outer cylindrical members may be polyethylene, polypropylene, polyvinyl chloride, polybutylene or other suitable thermoplastics having good weathering resistance, water resistance, gas impermeability, durability, etc.

To increase the efficiency of the method of the present invention, the step of forming an inner cylindrical member for one joint by injection molding and the step of forming two or more outer cylindrical member layers for other joints by injection molding may be conducted synchronously. For instance, when the outer cylindrical member is constituted by two layers (a first outer cylindrical member and a second outer cylindrical member), the injection molding of the inner cylindrical member for one joint, the injection molding of the first outer cylindrical member for another joint and the injection molding of the second outer cylindrical member for a further joint may be conduced at the same time. In this case, the longest molding time among the three steps corresponds to the overall injection molding cycle. Accordingly, this overall injection molding cycle is drastically shorter than that of a successive process in which the injection molding of each layer is conducted in a successive manner. When the above synchronous process is carried out in a single molding die, the production efficiency of the electric welding pipe joint is further improved.

Figure 1:
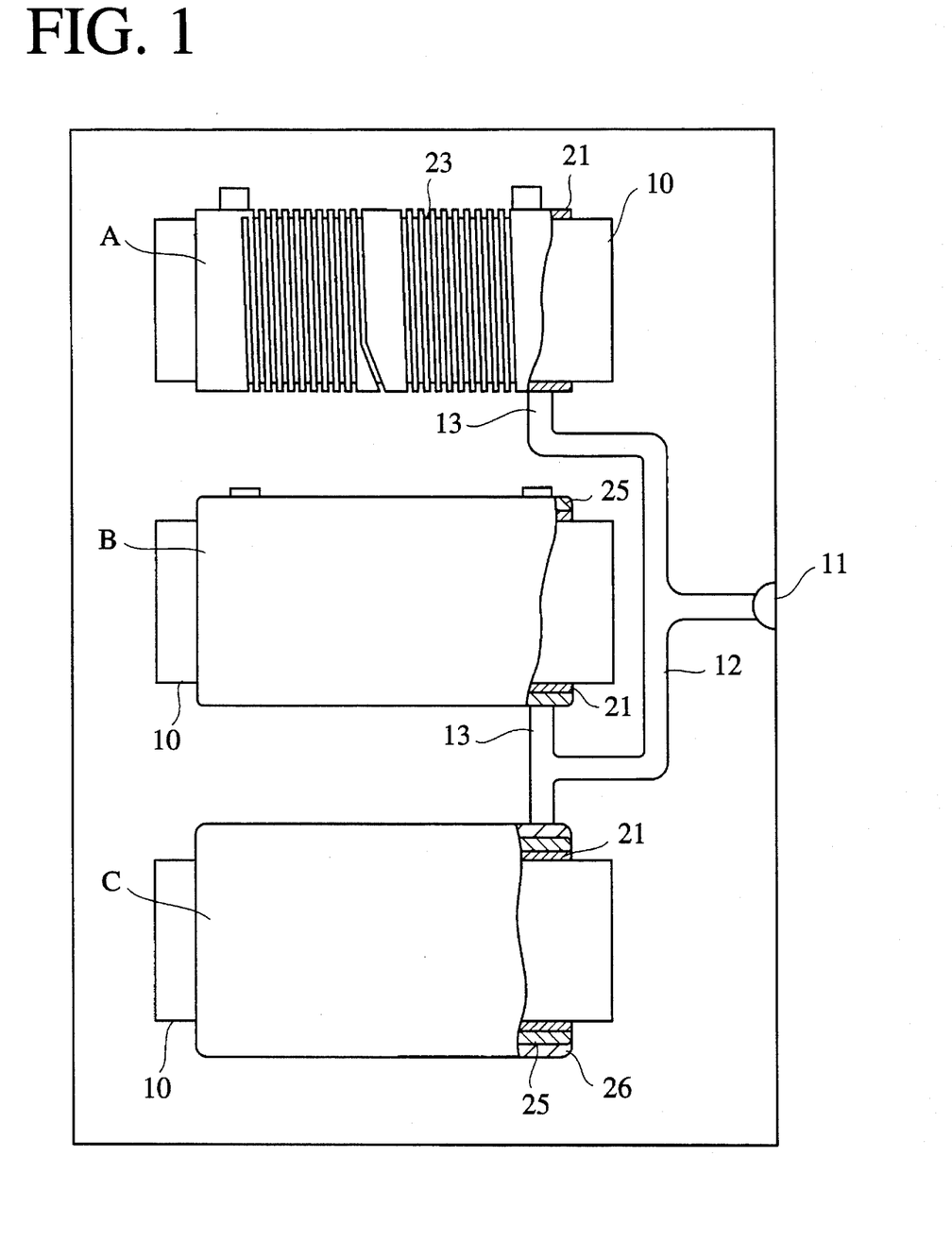
FIG. 1 is a plan view showing a die for injection-molding an electric welding pipe joint according to the present invention.

Referring to FIG. 1, in a die having three cavities A, B and C into which a molten resin is injected, the cavity A is smallest while the cavity C is largest. A common mandrel 10 may be inserted into each cavity A, B, C. A molten resin supplied through an inlet 11 of the die is injected into each cavity A, B, C through runners 12 and gates 13.

Figure 2:
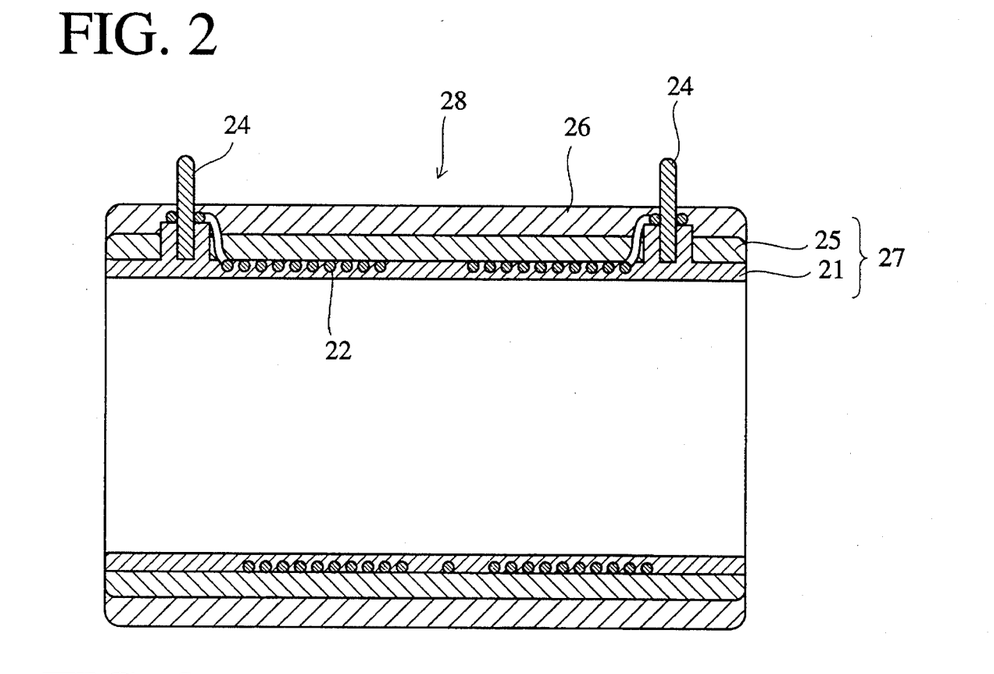
FIG. 2 is a cross-sectional view showing an electric welding pipe joint according to the first embodiment of the present invention.
Figure 3:
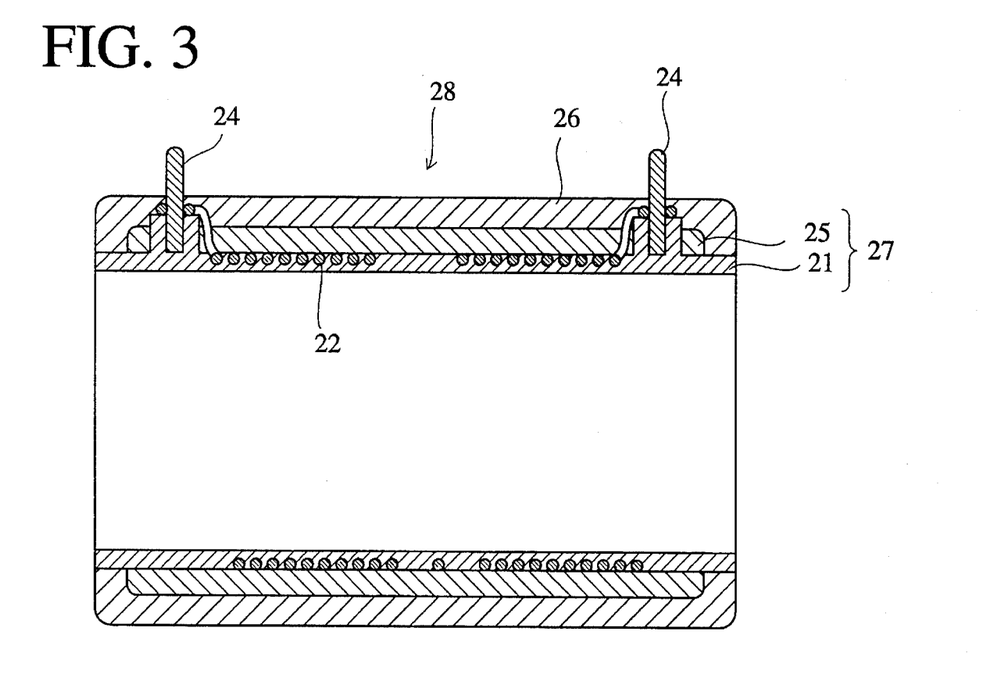
FIG. 3 is a cross-sectional view showing an electric welding pipe joint according to the second embodiment of the present invention.

When a molten resin is injected into a cavity A in which a mandrel 10 is placed, a thin inner cylindrical member 21 is formed as shown in FIGS. 1–3. After the injected thermoplastic resin is solidified in the cavity A, the mandrel 10 formed with the inner cylindrical thermoplastic resin member 21 having a spiral groove 23 on an outer surface is discharged from the die. A heating resistance wire 22 is wound around the thin inner cylindrical thermoplastic resin member 21 in the groove 23. In this case, the heating resistance wire 22 may be coated with a thermoplastic resin. As shown in FIG. 2, the heating resistance wire 22 is connected to pins 24, 24 fixed to the inner cylindrical member 21 at both ends.

After the inner cylindrical member 21 formed around the mandrel 10 and provided with the heating resistance wire 22 on an outer surface is placed in the cavity B, a molten resin is injected into the cavity B to form a first outer cylindrical member 25 integrally around the inner cylindrical member 21. Thus, an integral injection-molded product 27 consisting of the inner cylindrical member 21 and the first outer cylindrical member 25 is obtained. It should be noted that while the first outer cylindrical member 25 is injection-molded in the cavity B, another inner cylindrical member 21 may be injection-molded simultaneously in the cavity A.

After the injection-molded product 27 is formed in the cavity B, the injection-molded product 27 is discharged from the cavity B in a state in which the mandrel 10 is attached to the inner cylindrical member 21. Next, the injection-molded product 27 is inserted into the cavity C, and a molten resin is injected into the cavity C to form a second outer cylindrical member 26 around the injection-molded product 27. After discharged from the cavity C, the mandrel 10 is removed from the molded product to obtain the electric welding pipe joint 28 as shown in FIGS. 2 and 3. In the integral electric welding pipe joint 28 thus formed, the inner cylindrical member 21, the first outer cylindrical member 25 and the second outer cylindrical member 26 each made of a thermoplastic resin are fused integrally to each other by heat of the injected molten resin. During the injection molding of the second outer cylindrical member 26 for one joint in the cavity C, a thin inner cylindrical member 21 for another joint may be formed in the cavity A, and an injection-molded product 27 for a further joint may be formed in the cavity B.

Specifically, in a die having a plurality of cavities A, B and C as shown in FIG. 1, a mandrel 10 is inserted into the cavity A, an inner cylindrical member 21 which is formed around the mandrel 10 in the cavity A and is provided with a heating resistance wire 21 in a groove 23 on an outer surface is inserted into the cavity B, and an injection-molded product 27 (formed in the cavity B) consisting of the mandrel 10, the inner cylindrical member 21 formed around the mandrel 10 and the first outer cylindrical member 25 integrally formed around the inner cylindrical member 21 is positioned in the cavity C simultaneously. In this state, a molten resin is charged into the die through an inlet 11 to carry out injection molding simultaneously in the cavities A, B and C. Thus, one electric welding pipe joint can be completely obtained by a single injection molding cycle.

Since the injection time corresponds to the longest cooling time among the cavities A, B and C, the injection time can be reduced by decreasing the longest cooling time in the overall injection molding cycle.

Boundaries between the inner cylindrical member 21 and the first outer cylindrical member 25 and between the first outer cylindrical member 25 and the second outer cylindrical member 26 can easily be confirmed by microscopic observation. In a specific example in which a polyethylene resin (available from Showa Denko K. K. as "TR418G") was used to form an electric welding pipe joint at two different injection temperatures, it was microscopically observed that in each boundary between adjacent thermoplastic resin layers there was a layer (referred to as "modified resin layer" herein) having a different structure from those of the adjacent thermoplastic resin layers. This modified resin layer was as thick as 1.4 mm at 250° C. and 0.4 mm at 200° C. The measurement of adhesion strength between each thermoplastic resin layer in these two joints has revealed that the thicker the modified resin layer, the higher the adhesion strength thereof. The modified resin layer usually has a thickness of 2 mm or less.

The inner cylindrical member 21 and the first outer cylindrical member 25 may be formed from a resin (natural) such as polyethylene, while the second outer cylindrical member 26 may be formed from a weather-proofed resin such as carbon black-containing polyethylene.

The electric welding pipe joint shown in FIGS. 2 and 3 differ from each other in a structure at both ends. Specifically, in the electric welding pipe joint shown in FIG. 2, the inner cylindrical member 21, the first outer cylindrical member 25 and the second outer cylindrical member 26 have the same length in the longitudinal direction, the first outer cylindrical member 25 being exposed at both ends. On the other hand, in the electric welding pipe joint shown in FIG. 3, the first outer cylindrical member 25 is shorter than the inner cylindrical member 21 and the second outer cylindrical member 26, both ends of the first outer cylindrical member 25 being covered by the second outer cylindrical member 26. In this structure, the second outer cylindrical member 26 is fused to both the inner cylindrical member 21 and the first outer cylindrical member 25, increasing the adhesion of these three thermoplastic resin layers.

Figure 4:
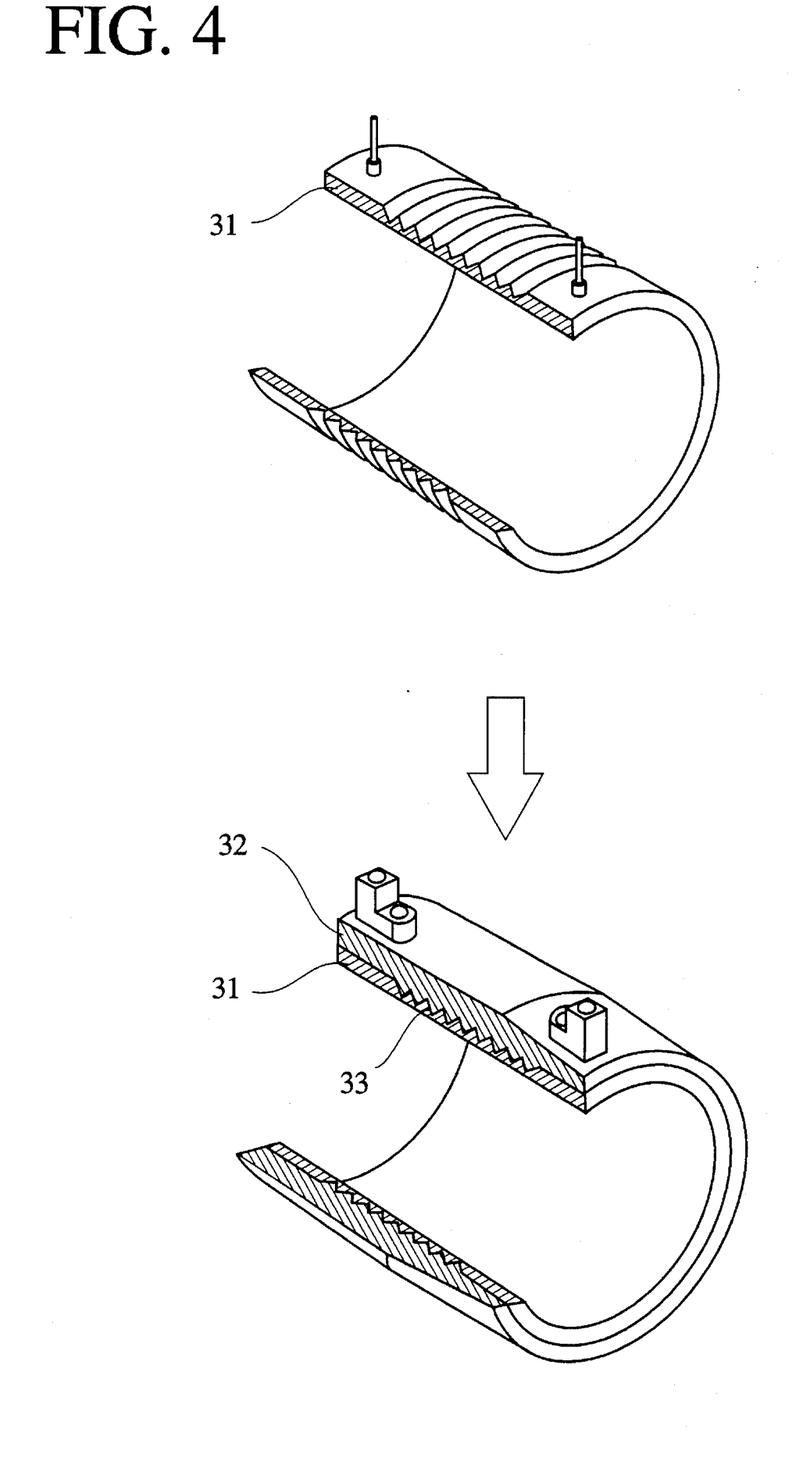
FIG. 4 is a partially broken perspective view schematically showing the steps of producing an electric welding pipe joint by a conventional method.
Figure 5:
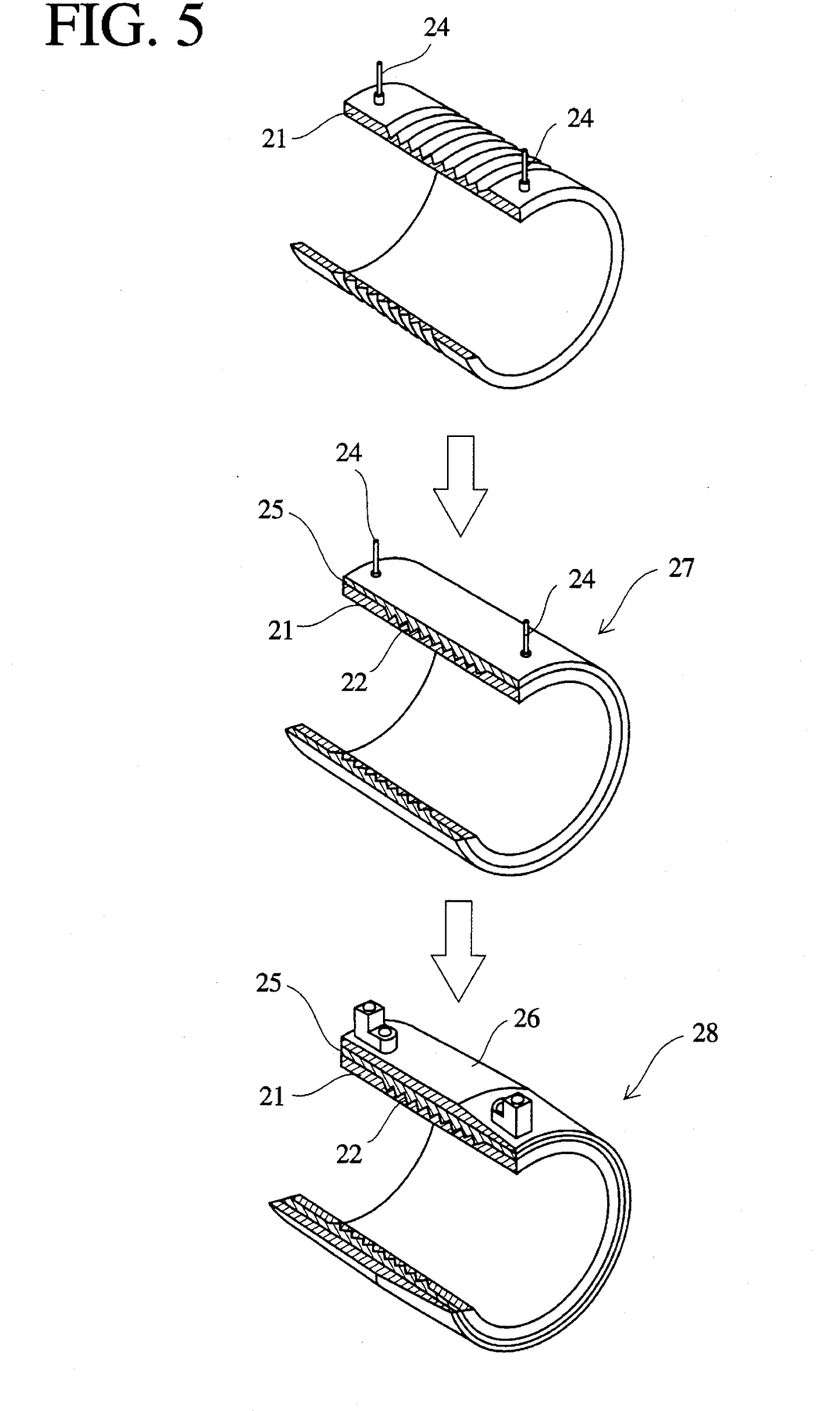
FIG. 5 is a partially broken perspective view schematically showing the steps of producing an electric welding pipe joint by the method of the present invention.
Figure 6:
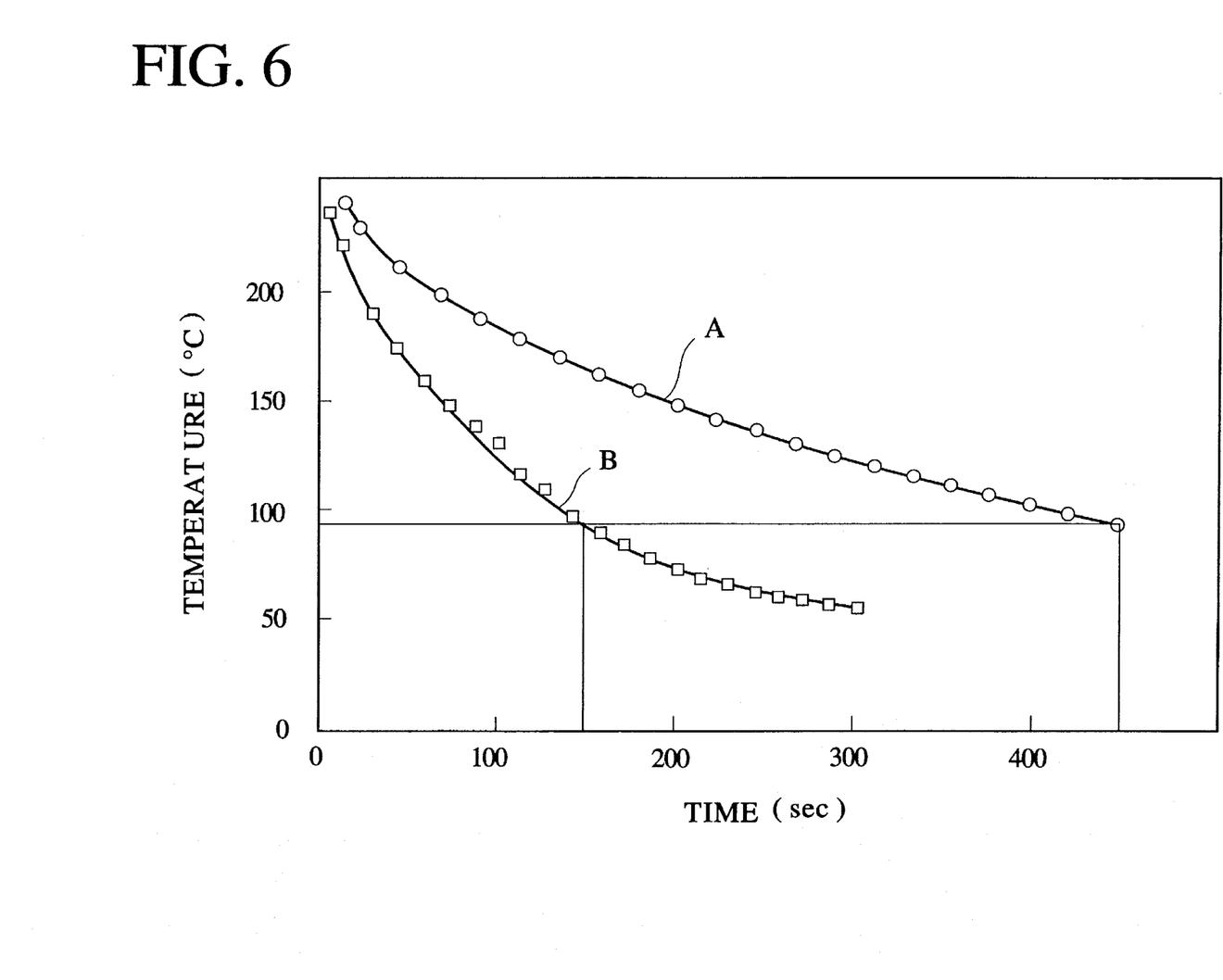
FIG. 6 is a graph showing the relations between a cooling time and a cooling temperature in a molding die.

FIG. 4 shows the steps of producing a socket-type electric welding pipe joint having a nominal bore diameter of 150 mm (6 inches), an outer diameter of 207 mm and a length of 248 mm, whose outer cylindrical member 32 has a thickness of 22 mm, by a conventional method. FIG. 5 shows the steps of producing a socket-type electric welding pipe joint having a nominal bore diameter of 150 mm (6 inches), an outer diameter of 207 mm and a length of 248 mm, whose second outer cylindrical member 26 has a thickness of 11 mm, by the method of the present invention. FIG. 6 shows how fast the outer cylindrical member 32 and the second outer cylindrical member 26 are cooled in a die. In FIG. 6, A denotes the temperature change with time of the 22-mm-thick outer cylindrical member 32 in the conventional electric welding pipe joint, and B denotes the temperature change with time of the 11-mm-thick second outer cylindrical member 26 in the electric welding pipe joint of the present invention. It is clear from FIG. 6 that if the electric welding pipe joint is discharged from the die at 95° C., the conventional one represented by A needs 450 seconds after injection of a molten resin, while that of the present invention represented by B needs only 150 seconds after injection of a molten resin. This means that the electric welding pipe joint of the present invention can be produced at a injection molding cycle as short as one-third of that of the conventional one.

Figure 7:
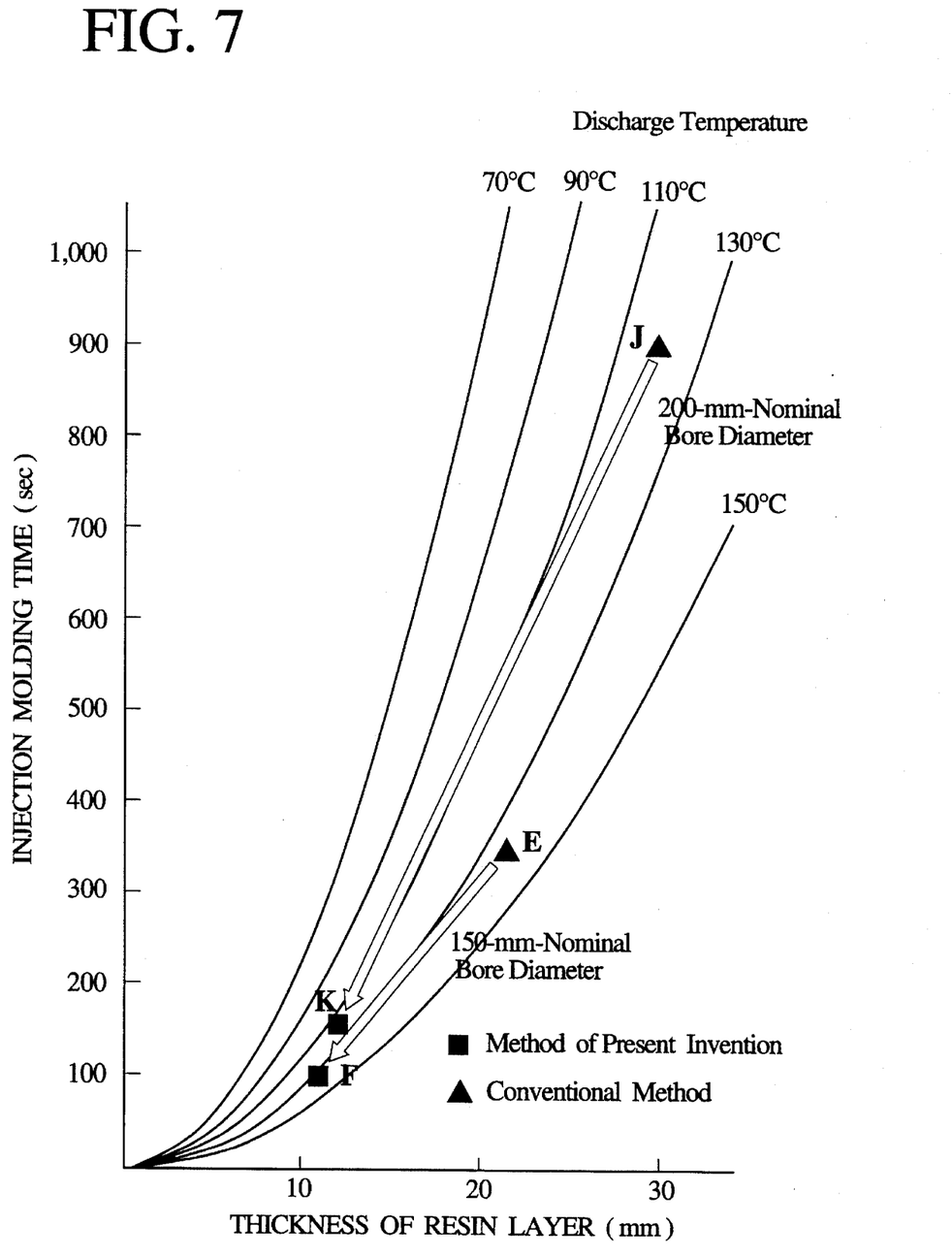
FIG. 7 is a graph showing the relations between a thickness of a resin layer and an injection molding time (cooling time) at each temperature at which the molding is discharged from the die.

The present invention will be described below in more detail with respect to specific embodiments in contrast with conventional electric welding pipe joints, referring to FIG. 7 showing the relation between the injection molding time (cooling time) and the thickness of a resin layer at a temperature at which the electric welding pipe joint is discharged from the die.

[1] First Embodiment

In the case of a socket-type electric welding pipe joint produced by the conventional method of FIG. 4 to have a nominal bore diameter of 150 mm (6 inches), the inner cylindrical member 31 has a smallest thickness $T_{in}$ 0.6 mm at a bottom of a spiral groove and a largest thickness $T_{max}$ of 5.5 mm in a spiral ridge as shown in FIG. 9, and the outer cylindrical member 32 formed around the inner cylindrical member 31 has a thickness $T_{out}$ of 22 mm. The cooling time of the inner cylindrical member 31 after injection molding is 90 seconds, and the cooling time of the outer cylindrical member 32 after injection molding is 360 seconds. The injection-molded pipe joint is discharged from the die at 135° C. The injection molding conditions of the outer cylindrical member 32 are plotted as a point E in FIG. 7.

On the other hand, in the embodiment of the present invention shown in FIG. 5, the inner cylindrical member 21 has the same size as that of the inner cylindrical member 31 of the above conventional electric welding pipe joint, and an outer cylindrical member (corresponding to the outer cylindrical member 32 of the conventional pipe joint) is constituted by an intermediate cylindrical member (first outer cylindrical member) 25 and a final outer cylindrical member (second outer cylindrical member) 26 each having a thickness of 11 mm, half of the thickness of the outer cylindrical member 32 of the above conventional electric welding pipe joint. As a result, the injection molding time is 100 seconds for each intermediate cylindrical member 25 and final outer cylindrical member 26. The injection-molded pipe joint is discharged from the die at 130° C. An electric welding pipe joint free from defects such as voids is thus obtained by this method. The injection molding conditions for the first and second outer cylindrical members 25, 26 are plotted as a point F in FIG. 7.

[2] Second Embodiment

In the case of another socket-type electric welding pipe joint produced by the method of FIG. 4 to have a nominal bore diameter of 200 mm (8 inches), an outer diameter of 278 mm and a length of 321 mm, the inner cylindrical member 31 has a smallest thickness $T_{in}$ of 0.8 mm at a bottom of a spiral groove and a largest thickness $T_{max}$ of 5.5 mm at a top of a spiral ridge, and the outer cylindrical member 32 formed around the inner cylindrical member 31 has a thickness $T_{out}$ of 28 mm. The cooling time of the inner cylindrical member 31 after injection molding is 100 seconds, and the cooling time of the outer cylindrical member 32 after injection molding is 900 seconds as shown by a point J in FIG. 7. The injection-molded pipe joint is discharged from the die at 120° C.

On the other hand, in the embodiment of the present invention shown in FIG. 5, the inner cylindrical member 21 has the same size as that of the inner cylindrical member 31 of the above conventional electric welding pipe joint, and an outer cylindrical member (corresponding to the outer cylindrical member 32) is constituted by an intermediate cylindrical member (first outer cylindrical member) 25 and a final outer cylindrical member (second outer cylindrical member) 26 each having a thickness of 14 mm, half of the thickness of the outer cylindrical member of the above conventional electric welding pipe joint. As a result, the injection molding time is 150 seconds for each of the intermediate cylindrical member 25 and the final outer cylindrical member 26 as shown by a point K in FIG. 7. The injection-molded pipe joint is discharged from the die at 115° C., lower than the temperature for the conventional electric welding pipe joint. An electric welding pipe joint free from defects such as voids is thus obtained by this method.

[3] Third Embodiment

Figure 8:
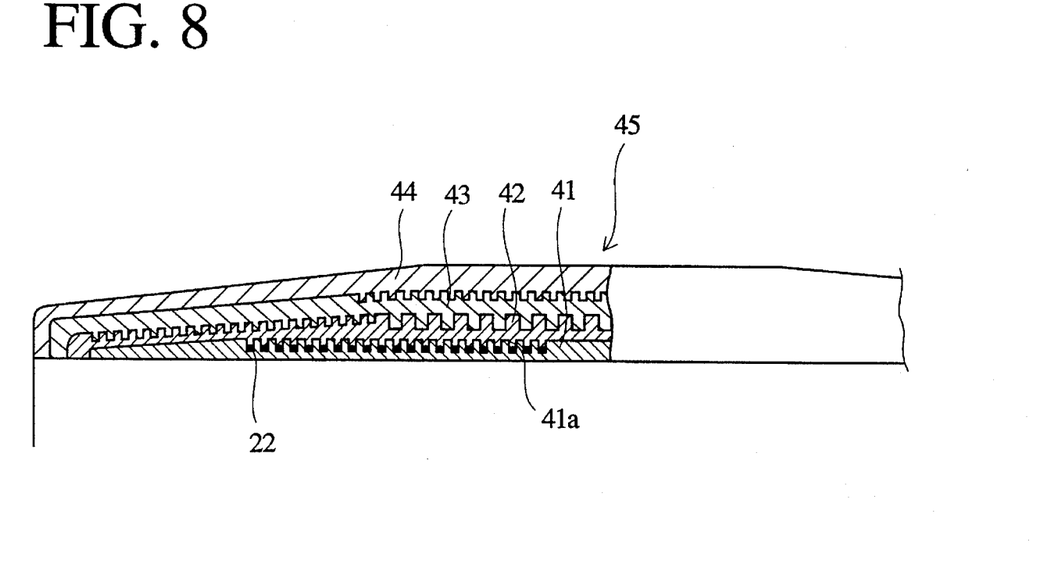
FIG. 8 is a cross-sectional view showing an electric welding pipe joint according to the third embodiment of the present invention.

FIG. 8 shows a socket-type electric welding pipe joint having a nominal bore diameter of 200 mm (8 inches) according to the third embodiment of the present invention which comprises an inner cylindrical member and an outer cylindrical member constituted by three layers to reduce the injection molding time. The inner cylindrical member 41 is wound with a heating resistance wire 22 in a spiral groove 41a on an outer surface, and first, second and third outer cylindrical members 42, 43 and 44 are injection-molded in this order around the outer surface of the inner cylindrical member 41 to form an integral electric welding pipe joint 45. Each of the first, second and third outer cylindrical members 42, 43 and 44 has a thickness of 9.5 mm, about one-third of the thickness (28 mm) of the outer cylindrical member 32 of the conventional electric welding pipe joint.

In this embodiment, both of the first outer cylindrical member 42 and the second outer cylindrical member 43 have grooves on their outer surfaces to increase their surface areas which are brought into contact with an inner surface of the die cavity, thereby increasing cooling efficiency of the injected thermoplastic resin, leading to reduction of cooling time. Further, since a contact area increases between adjacent injected resin layers, their adhesion strength increases.

The time interval between the injection of a molten resin and the discharge of the injection-molded product, which may be called "cooling time," was 115 seconds for the first outer cylindrical member 42 whose cooling time is longest, and the discharge temperature was 100° C. Accordingly, the electric welding pipe joint comprising four cylindrical members enjoys an injection molding cycle drastically reduced from 900 seconds to 115 seconds at a lower discharge temperature. This four-layer pipe joint also has an injection molding cycle reduced by 35 seconds from 150 seconds to 115 seconds, comparing with the above three-layer pipe joint.

Though two or three outer cylindrical member layers are explained in the above embodiments, it should be noted that the outer cylindrical member may be constituted by four or more thermoplastic resin layers depending on the shape and size of the electric welding pipe joint and the specification of a molding die. However, considering the shape of a joint and the easiness and time of forming each layer, the outer cylindrical member may preferably be constituted by two to four thermoplastic resin layers.

As shown in FIGS. 3 and 8, the outer cylindrical member may be divided to three to five layers not only in a radial direction but also in a longitudinal direction.

With respect to the injection molding die, it is not restricted to the die having three cavities A, B and C as described above, and a plurality of dies each having one or more cavities may be used to form multi-layered outer cylindrical members successively or simultaneously.

As described above in detail, since each thermoplastic resin layer constituting the outer cylindrical member is thin, the injection pressure of a molten resin may be low. Accordingly, it is possible to prevent the thin inner cylindrical thermoplastic resin member from melting at the time of injection molding of the outer cylindrical member, thereby avoiding the irregular displacement of a heating resistance wire in the joint. Thus, the short circuiting of the heating resistance wire can be prevented in the pipe-connecting operation. Further, since each layer of the outer cylindrical member is quickly cooled after the injection molding, it does not suffer from internal defects such as voids, and the injection molding operation can be completed in a short period of time.

The electric welding pipe joint of the present invention can have a nominal bore diameter of 75 mm (3 inches) or more, particularly 100 mm (4 inches) or more. Such electric welding pipe joint preferably has an inner cylindrical member and an outer cylindrical member each constituted by two or more resin layers having a thickness of 15 mm or less, preferably 10 mm or less.

In the method of the present invention, a large injection pressure or a long injection time is not required to prevent voids, etc., a smaller injection molding machine can be used for the production of large-diameter pipe joint.

What is claimed is:

1. An electric welding pipe joint comprising (a) a joint body comprised of an inner cylindrical member made of a thermoplastic resin, and an outer cylindrical member formed around said inner cylindrical member and constituted by at least two thermoplastic resin layers, and (b) a wound heating resistance wire disposed in said joint body between an outer surface of said inner cylindrical member and an inner surface of said outer cylindrical member.

2. The electric welding pipe joint according to claim 1, wherein said joint has a nominal bore diameter of at least 75 mm.

3. The electric welding pipe joint according to claim 2, wherein said outer cylindrical member has a thickness of at least 10 mm, and each layer constituting said inner cylindrical member and said outer cylindrical member has a thickness no greater than 15 mm.

4. The electric welding pipe joint according to claim 1, wherein said joint comprises a modified resin layer between adjacent thermoplastic resin layers of said inner cylindrical member, between adjacent thermoplastic layers of said outer cylindrical member, or between said adjacent thermoplastic layers of said inner cylindrical member and said adjacent thermoplastic layers of said outer cylindrical member.

5. The electric welding pipe joint according to claim 4, wherein said modified resin layer has a thickness of no greater than 2 mm.

6. The electric welding pipe joint according to claim 1, wherein said inner cylindrical member is constituted by winding a thermoplastic resin-coated heating resistance wire.

7. The electric welding pipe joint according to claim 1, wherein grooves are formed at a boundary between said inner cylindrical member and said outer cylindrical member, at a boundary between adjacent layers of said outer cylindrical member, or at both of said boundaries.

8. The electric welding pipe joint according to claim 2, wherein grooves are formed at a boundary between said inner cylindrical member and said outer cylindrical member, at a boundary between adjacent layers of said outer cylindrical member, or at both of said boundaries.

9. The electric welding pipe joint according to claim 3, wherein grooves are formed at a boundary between said inner cylindrical member and said outer cylindrical member, at a boundary between adjacent layers of said outer cylindrical member, or at both of said boundaries.

10. The electric welding pipe joint according to claim 1, wherein a first layer of said outer cylindrical member is covered by a second layer of said outer cylindrical member at both ends of said pipe joint in a longitudinal direction.

11. The electric welding pipe joint according to claim 2, wherein a first layer of said outer cylindrical member is covered by a second layer of said outer cylindrical member at both ends of said pipe joint in a longitudinal direction.

12. The electric welding pipe joint according to claim 3, wherein a first layer of said outer cylindrical member is covered by a second layer of said outer cylindrical member at both ends of said pipe joint in a longitudinal direction.

13. The electric welding pipe joint according to claim 7, wherein a first layer of said outer cylindrical member is covered by a second layer of said outer cylindrical member at both ends of said pipe joint in a longitudinal direction.

14. An electric welding pipe joint comprising (a) a joint body composed of an inner cylindrical member made of a thermoplastic resin, and an outer cylindrical member constituted by at least two thermoplastic resin layers, said thermoplastic resin layers of said outer cylindrical member being injection-molded around said inner cylindrical member successively, and (b) a heating resistance wire wound around an outer surface of said inner cylindrical member and embedded in said joint body.

15. A method for producing an electric welding pipe joint made of a thermoplastic resin and comprising a heating resistance wire therein, said method comprising the steps of:

(a) forming an inner cylindrical member of a thermoplastic resin by injection molding;

(b) winding said heating resistance wire around said inner cylindrical member; and (c) forming at least two thermoplastic resin layers of an outer cylindrical member around the resistance wire-wound inner cylindrical member by injection molding successively.

16. The method according to claim 15, wherein the step (c) comprises forming a first outer cylindrical member around said inner cylindrical member and forming a second outer cylindrical member around said first outer cylindrical member.

17. The method according to claim 15, wherein at least three injection molding cavities are used to synchronously conducting the step (a) of forming said inner cylindrical member for one joint by injection molding, the step (b) of forming a first outer cylindrical member around said inner cylindrical member for another joint by injection molding, and the step (c) of forming a second outer cylindrical member around said first outer cylindrical member for a further joint by injection molding, the synchronous steps (a), (b) and (c) being repeated.

18. The method according to claim 17, wherein said steps (a), (b) and (c) are synchronous steps conducted in a single injection molding die.

19. The method according to claim 15, wherein at least either one of said inner cylindrical member and said multilayered outer cylindrical member has a grooved outer surface.

20. A method for successively producing a plurality of electric welding pipe joints each made of a thermoplastic resin and comprising a heating resistance wire therein, said method comprising:

(a) a first synchronous process comprising the step (i) of forming an inner cylindrical member of a thermoplastic resin for one joint by injection molding, the step (ii) of injection-molding a first outer cylindrical thermoplastic resin member around an outer surface of said inner cylindrical member after wound with said heating resistance wire for another joint, and the step (iii) of injection-molding a second outer cylindrical thermoplastic resin member around an outer surface of said first outer cylindrical member for a further joint, thereby providing a three-layer electric welding pipe joint; and (b) a second synchronous process comprising the step (iv) of freshly injection-molding the same inner cylindrical member as in said step (i) for a still further joint, the step (v) of injection-molding a first outer cylindrical thermoplastic resin member around an outer surface of the inner cylindrical member obtained in said step (i), and the step (vi) of injection-molding a second outer cylindrical thermoplastic resin member around an outer surface of said first outer cylindrical member obtained in said step (ii), thereby providing a three-layer electric welding pipe joint, the second synchronous process being repeated.

21. The method according to claim 20, wherein said first and second synchronous processes are separately conducted in a single injection molding die.

* * * * *